United States Patent
Misaka

[11] Patent Number: 5,499,351
[45] Date of Patent: Mar. 12, 1996

[54] ARRANGEMENT OF DETECTING BRANCH ERROR IN A DIGITAL DATA PROCESSING SYSTEM

[75] Inventor: Toshio Misaka, Tokyo, Japan

[73] Assignee: NEC Corporation, Tokyo, Japan

[21] Appl. No.: 483,882

[22] Filed: Jun. 7, 1995

Related U.S. Application Data

[63] Continuation of Ser. No. 15,000, Feb. 8, 1993, abandoned.

[30] Foreign Application Priority Data

Feb. 6, 1992 [JP] Japan .................................. 4-056241

[51] Int. Cl.$^6$ ............................................. G06F 9/32
[52] U.S. Cl. ...................... 395/375; 364/938; 364/261.3
[58] Field of Search ............................ 371/19; 395/375, 395/800

[56] References Cited

U.S. PATENT DOCUMENTS

| | | | |
|---|---|---|---|
| 3,673,573 | 6/1972 | Smith | 395/375 |
| 3,728,690 | 4/1973 | Holtey | 395/375 |
| 4,777,594 | 10/1988 | Jones et al. | 395/375 |
| 4,920,538 | 4/1990 | Chan | 371/19 |
| 5,008,807 | 4/1991 | Krueger | 395/375 |
| 5,014,276 | 5/1991 | Bush | 371/37.4 |
| 5,155,843 | 10/1992 | Stamm | 395/575 |
| 5,261,071 | 11/1993 | Lyon | 395/425 |

*Primary Examiner*—David Y. Eng
*Attorney, Agent, or Firm*—Foley & Lardner

[57] ABSTRACT

A signal which requires an interruption of execution of program instructions stored in a memory, is produced. The program instructions include an entry point instruction at an entry point to which a branch instruction transfers control. An instruction decoder is operatively coupled to the memory and receives the program instructions in sequence. A preceding branch instruction is coupled to the decoder and is arranged to store a signal which is applied from the decoder and which indicates whether or not the program instruction decoded by the decoder is a branch instruction. The instruction decoder further receives the signal from the indicator. The instruction decoder produces the first mentioned signal when receiving the entry point instruction which indicates that control has been transferred to a new program flow, if the signal indicates that the program instruction decoded by the decoder is not a branch instruction.

5 Claims, 5 Drawing Sheets

FIG. 1
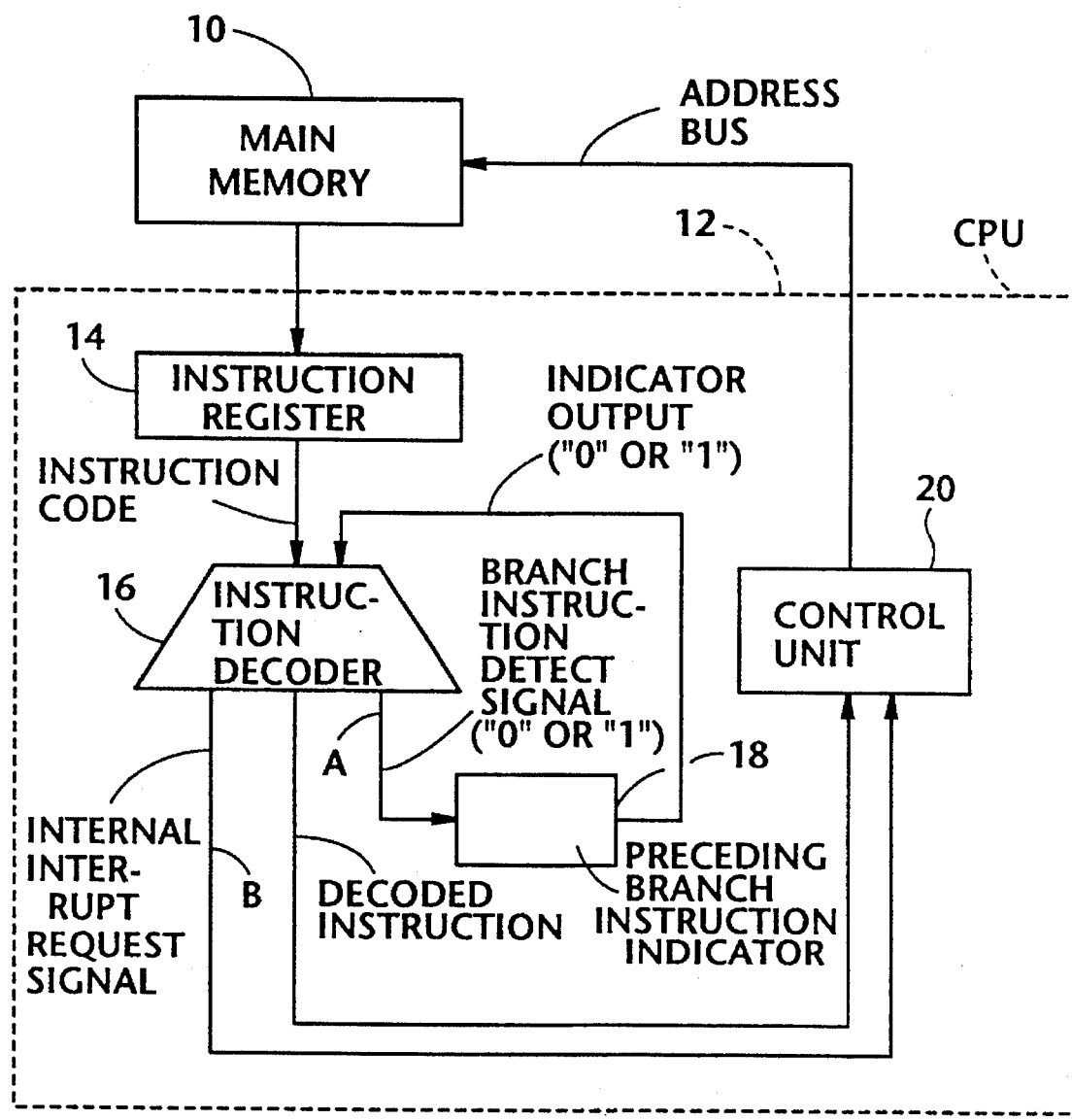
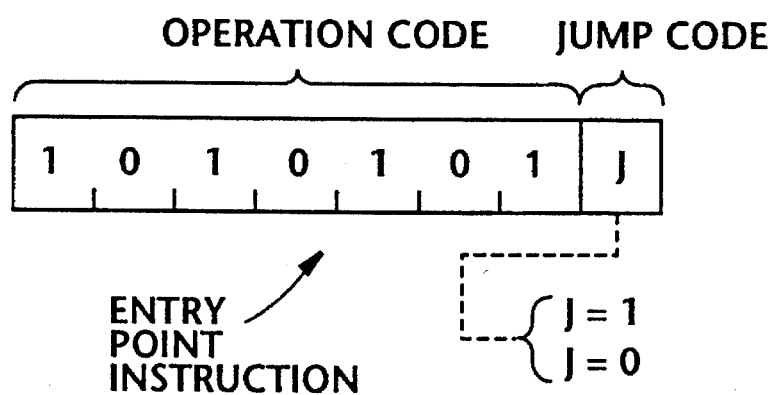
FIG. 2

FIG. 4

| INPUT TO INSTRUCTION DECODER 16 | | OUTPUT OF INSTRUCTION DECODER 16 | |
| --- | --- | --- | --- |
| INSTRUCTION FROM REGISTER 14 | OUTPUT OF 18 | BRANCH INST DETECT SIGNAL A | INTERNAL INTERRUPT REQUEST SIGNAL B |
| A  1 0 1 0 1 0 1 0 | 0 | 0 | 1 |
| B  1 0 1 0 1 0 1 0 | 1 | 0 | 0 |
| C  1 0 1 0 1 0 1 1 | 0 | 0 | 0 |
| D  1 0 1 0 1 0 1 1 | 1 | 0 | 0 |
| E  BRANCH INSTRUCTION | 0 | 1 | 0 |
| F  " | 1 | 0 | 1 |
| G  INSTRUCTION EXCEPT FOR BRANCH AND ENTRY POINT INSTRUCTIONS | 0 | 0 | 0 |
| H  " | 1 | 0 | 1 |

FIG. 7

| | INPUT TO INSTRUCTION DECODER 16' | | OUTPUT TO INSTRUCTION DECODER 16' | |
|---|---|---|---|---|
| | INSTRUCTION FROM REGISTER 14 | OUTPUT OF 18' | BRANCH INST TYPE INDICAT- ING SIGNAL A | INTERNAL INTERRUPT REQUEST SIGNAL B |
| A | CONDITIONAL BRANCH | 0 0 0 0 | 0 0 0 1 | 0 |
| B | " | EXCEPT FOR ALL ZEROS | 0 0 0 0 | 1 |
| C | UNCONDITIONAL BRANCH | 0 0 0 0 | 0 0 1 0 | 0 |
| D | " | EXCEPT FOR ALL ZEROS | 0 0 0 0 | 1 |
| E | SUBROUTINE CALL | 0 0 0 0 | 0 1 0 0 | 0 |
| F | " | EXCEPT FOR ALL ZEROS | 0 0 0 0 | 1 |
| G | SUBROUTINE RETURN | 0 0 0 0 | 1 0 0 0 | 0 |
| H | " | EXCEPT FOR ALL ZEROS | 0 0 0 0 | 1 |
| I | 1 0 1 * * * 1 * | 0 0 0 1 | 0 0 0 0 | 0 |
| J | EXCEPT FOR ABOVE | 0 0 0 1 | 0 0 0 0 | 1 |
| K | 1 0 1 * * 1 * * | 0 0 1 0 | 0 0 0 0 | 0 |
| L | EXCEPT FOR ABOVE | 0 0 1 0 | 0 0 0 0 | 1 |
| M | 1 0 1 * 1 * * * | 0 1 0 0 | 0 0 0 0 | 0 |
| N | EXCEPT FOR ABOVE | 0 1 0 0 | 0 0 0 0 | 1 |
| O | 1 0 1 1 * * * * | 1 0 0 0 | 0 0 0 0 | 0 |
| P | EXCEPT FOR ABOVE | 1 0 0 0 | 0 0 0 0 | 1 |
| Q | 1 0 1 * * * * 0 | 0 0 0 0 | 0 0 0 0 | 1 |
| R | 1 0 1 * * * * 0 | EXCEPT FOR ALL ZEROS | 0 0 0 0 | 0 |
| S | 1 0 1 * * * * 1 | 0 0 0 0 | 0 0 0 0 | 0 |
| T | 1 0 1 * * * * 1 | EXCEPT FOR ALL ZEROS | 0 0 0 0 | 0 |
| U | INST EXCEPT FOR BRANCH AND ENTRY POINT INSTRUCTIONS | 0 0 0 0 | 0 0 0 0 | 0 |
| V | " | EXCEPT FOR ALL ZEROS | 0 0 0 0 | 1 |

* : BIT NOT CONSIDERED 5,499,351

ARRANGEMENT OF DETECTING BRANCH ERROR IN A DIGITAL DATA PROCESSING SYSTEM

This application is a continuation of application Ser. No. 08/015,000, filed Feb. 8, 1993, now abandoned.

BACKGROUND OF THE INVENTION

1. Field of the Invention

The present invention relates to improvements in a digital data processing system, and more specifically to a hardware arrangement of producing a signal which requires an interruption of execution of program instructions upon detecting an unexpected control transfer which a programmer does not expect. The present invention is well suited for debugging a program.

2. Description of the Prior Art

It is not seldom in a digital data processing system that an operation flow is strayed or directed to an unexpected program flow due to programming errors or electric noises induced at computer elements such as a microprocessor, etc. If such an undesirable situation happens, it is necessary to detect same and terminate runaway of the program as quickly as possible.

According to a programmer's reference manual of the Intel 80386 microprocessor (for example), each of program segments is provided with a segment limit specifying the size of the segment. If control is transferred to an address outside the segment limit, the execution of a program is discontinued or interrupted by the processor. Further, in a so-called paging mode, each page is provided with an attribute which indicates whether or not control can be transferred to the page. If control is transferred to such a page that is prohibited to be accessed, the processor interrupts the execution of the program. Still further, it an instruction which has not been defined is to be executed or, if an instruction which includes inexecutable operand, then a processor interrupts the execution of the program.

Throughout the instant disclosure, each of the aforesaid interrupts is called an "internal interrupt" in that a processor detects the above mentioned events therewithin and then interrupts the execution of a program.

Let us consider the case where a branch instruction is executed but control is erroneously transferred to an instruction which is not expected by a programmer. Even in such a case, however, the program may be executed from the entry point (viz., target address) without causing any interruption by the processor. This is because the processor fails to detect one of the above mentioned interrupt conditions. Thus, the program is executed until the processor eventually detects one of the above mentioned conditions and then interrupts the program run.

It is therefore highly desirable to request an internal interrupt to the processor immediately after a branch instruction causes transition of control to an entry point which a programmer does not expect. That is, in such a case, it is very important to terminate the execution of a program as quickly as possible in that it becomes difficult to correctly specify the cause once the program enters into a condition of runaway.

SUMMARY OF THE INVENTION

It is an object of the present invention to provide an arrangement of producing a signal which requests a processor to interrupt the execution of a program if a branch instruction transfers control to an instruction which is not expected by a programmer.

More specifically an aspect of the present invention resides in an arrangement wherein a signal which requires an interruption of execution of program instructions stored in a memory, is produced. The program instructions includes an entry point instruction at an entry point to which a branch instruction transfers control. A instruction decoder is operatively coupled to the memory and receives the program instructions in sequence. A preceding branch instruction is coupled to the decoder and is arranged to store a signal which is applied from the decoder and which indicates whether or not the program instruction decoded by the decoder is a branch instruction. The instruction decoder further receives the signal from the indicator. The instruction decoder produces the first mentioned signal when receiving the entry point instruction which indicates that control has been transferred to a new program flow, if the signal indicates that the program instruction decoded by the decoder is not a branch instruction.

Another aspect of the present invention resides in a hardware arrangement of producing a first signal which requires an interruption of execution of program instructions stored in a memory, the program instructions including an entry point instruction at an entry point to which a branch instruction transfers control, the hardware arrangement comprising: first means which is operatively coupled to the memory and receives the program instructions in sequence, the first means decoding each of the program instructions applied thereto; said second means which is coupled to the first means, the second means holding a second signal which is applied from the first means and which indicates whether or not the program instruction decoded by the first means is a branch instruction, wherein the first means further receives the second signal from the second means, the first means producing the first signal when receiving the entry point instruction which indicates that control has been transferred to a new program flow, if the second signal indicates that the program instruction decoded by the first means is not a branch instruction.

BRIEF DESCRIPTION OF THE DRAWINGS

The features and advantages of the present invention will become more clearly appreciated from the following description taken in conjunction with the accompanying drawings in which like elements are denoted by like reference numerals and in which:

FIG. 1 is a block diagram which schematically illustrates a first embodiment of the present invention;

FIG. 2 is a diagram showing a code format of an entry point instruction which is used with the first embodiment and which is introduced by the present invention;

FIG. 4 is a table for discussing the operations of a block of FIG. 1;

FIG. 7 is a table for discussing the operations of a block of FIG. 5.

DETAILED DESCRIPTION OF THE PREFERRED EMBODIMENTS

Figure 3A:
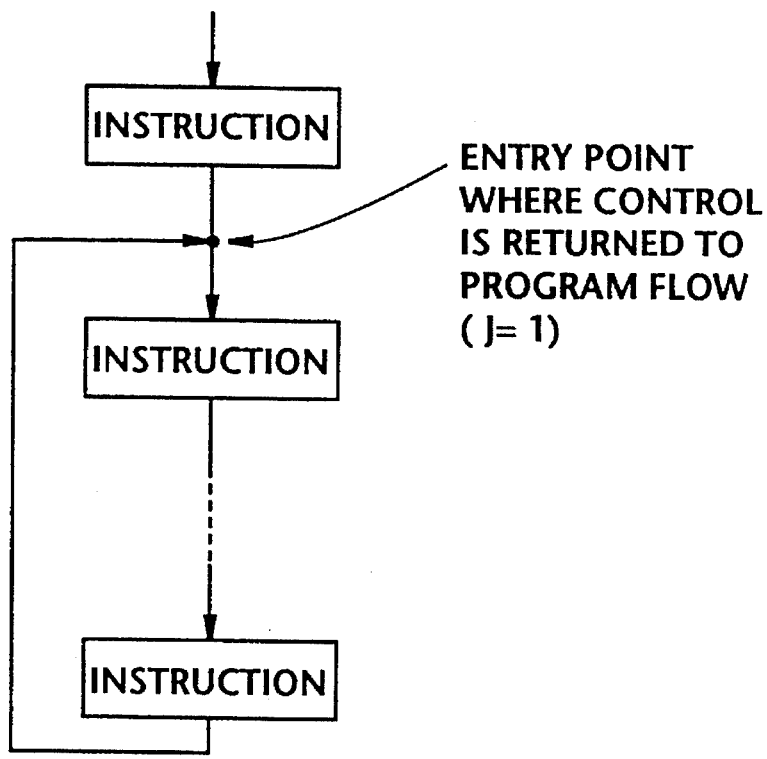
FIG. 3A is a flowchart which indicates an entry point where control is returned to a program flow.

A first embodiment of the present invention will be discussed with reference to FIGS. 1–4.

As shown in FIG. 1, a main memory 10 is interconnected to a CPU (central processing unit) 12 which includes an instruction register 14, an instruction decoder 16, a preceding branch instruction indicator 18, and a control unit 20, all of which are coupled as illustrated.

According to the present invention, a programmer is required to locate an entry point instruction at each of the entry points to which control is transferred by a branch instruction.

As shown in FIG. 2, the entry point instruction has a length of one byte (8 bits) which includes an operation code (7 bits) and a jump code (one bit) depicted by a capital letter "J". The operation code is set to "1010101" in this particular case but not limited thereto. That is, the operation code of the entry point instruction, can be set to another sequence of bits if uniquely distinguishable from the operations codes of the instructions which have been defined by a manufacturer of a processor.

Figure 3B:
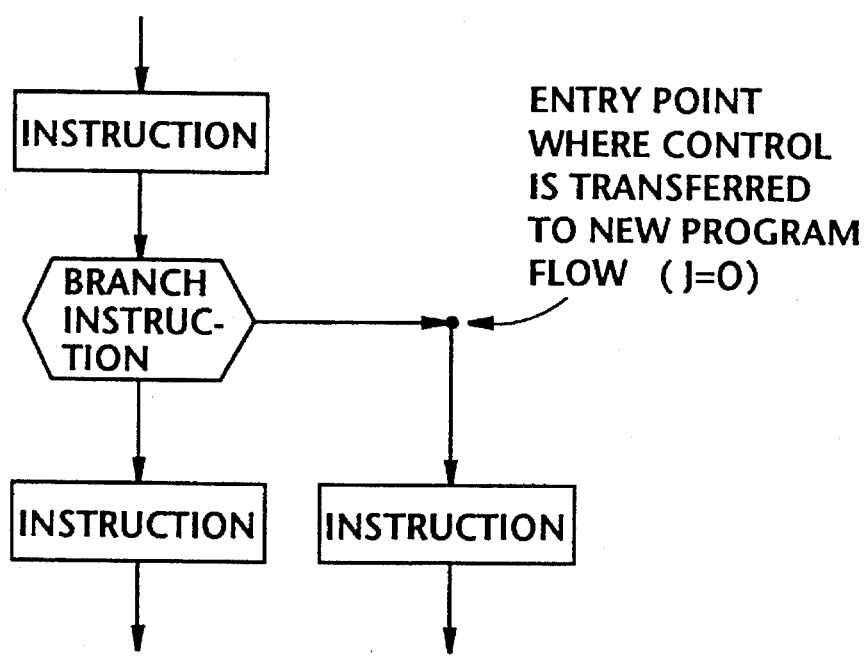
FIG. 3B is a flowchart which indicates an entry point where control is transferred to a new program flow.

The jump code "J" assumes a logic 1 if a branch instruction transfers control to an entry point where control is returned to the original program flow (FIG. 3A). Contrarily, the jump code "J" assumes a logic 0 in the case where a branch instruction transfers control to an entry point where control is transferred to a new program flow (FIG. 3B).

The operations of the first embodiment will be discussed hereinafter.

An instruction to be processed is derived from the main memory 10 in response to a corresponding instruction address applied thereto from the control unit 20. The instruction thus fetched (viz., the next instruction to be executed) is held in the instruction register 14. The instruction decoder 16 is supplied with the program instruction from the register 14 and an output of the preceding branch instruction indicator 18. The indicator 18 is set to a logic 1 if the instruction which precedes the instruction applied to the decoder 16, is a branch instruction. Otherwise, the indicator 18 is set to a logic 0. A branch instruction detect signal, outputted from the decoder 16, is depicted by A. The indicator 18 retains the content thereof until the instruction decoder 16 issues the next decoding result. The instruction decoder 16 outputs a decoded instruction and an internal interrupt request signal (denoted by B), both of which are applied to the control unit 20. The signal B assumes a logic 1 when an internal interrupt is required. Otherwise, the signal B assumes a logic 0.

Reference is made to FIG. 4, wherein the relationships between the inputs and outputs of the instruction decoder 16 are shown. There are three cases wherein the instruction decoder 16 issues the internal interrupt request signal B which assumes a logic 1. The three cases are illustrated in rows A, F and H of FIG. 4. In FIG. 4, each of the bits enclosed by a broken line is the above mentioned jump code.

Firstly, the request signal B assumes a logic 1 if the decoder 16 receives an entry point instruction (viz., the next instruction) which includes the jump code assuming a logic 0 and simultaneously if the decoder 16 receives the output of the indicator 18 which assumes a logic 0 indicating that the preceding instruction is not a branch instruction. In more specific terms, if the preceding instruction is not a branch instruction, it is incorrect or erroneous if the decoder 16 receives the entry point instruction which indicates that control is transferred to the entry point shown in FIG. 3B.

The second case where the internal request signal B assumes a logic 1, is discussed (the case shown in row F of FIG. 4). In this instance, the preceding instruction is a branch instruction (the output of the indicator 18 assumes a logic 1). However, the next instruction is again a branch instruction. It is understood that if the preceding instruction is a branch instruction, the next instruction applied from the register 14 to the decoder 16 should be the entry point instruction. Thus, the decoder 15 issues the signal B which assumes a logic 1 and requests the control unit 20 to implement the internal interrupt.

The third case where the internal request signal assumes a logic 1, is discussed (the case shown in row H of FIG. 4). In this instance, the preceding instruction is a branch instruction as in the above mentioned second case. However, the next instruction is not the entry point instruction (viz., an instruction which is neither a branch instruction nor the entry point instruction). It is understood that if the preceding instruction is a branch instruction, the next instruction applied from the register 14 to the decoder 16 should be the entry point instruction. Thus, the decoder 16 issues the signal B which assumes a logic 1 and requests the control unit 20 to implement the internal interrupt.

In the other cases illustrated in rows B, C, D, E and G (FIG. 4), the decoder 16 applies no request of internal interrupt to the control unit 20 (viz., the signal B assuming a logic 0). More specifically, in the case where the output of the indicator 18 shows that a branch instruction is preceded (the cases of rows B and D), it is correct if the next instruction applied to the decoder 16 is the entry point instruction.

Further, even if the output of the indicator 18 shows that a branch instruction is not preceded, it is correct if control is transferred to a target address at which the entry point instruction has been set (the case of row C).

Still further, in the case where the output of the indicator 18 indicates that a branch instruction is not preceded, if the next instruction applied to the decoder 16 is not the entry point instruction, it is understood that the program is correctly executed (the case of rows E and G).

A second embodiment of the present invention will be discussed with reference to FIGS. 5–7.

Figure 5:
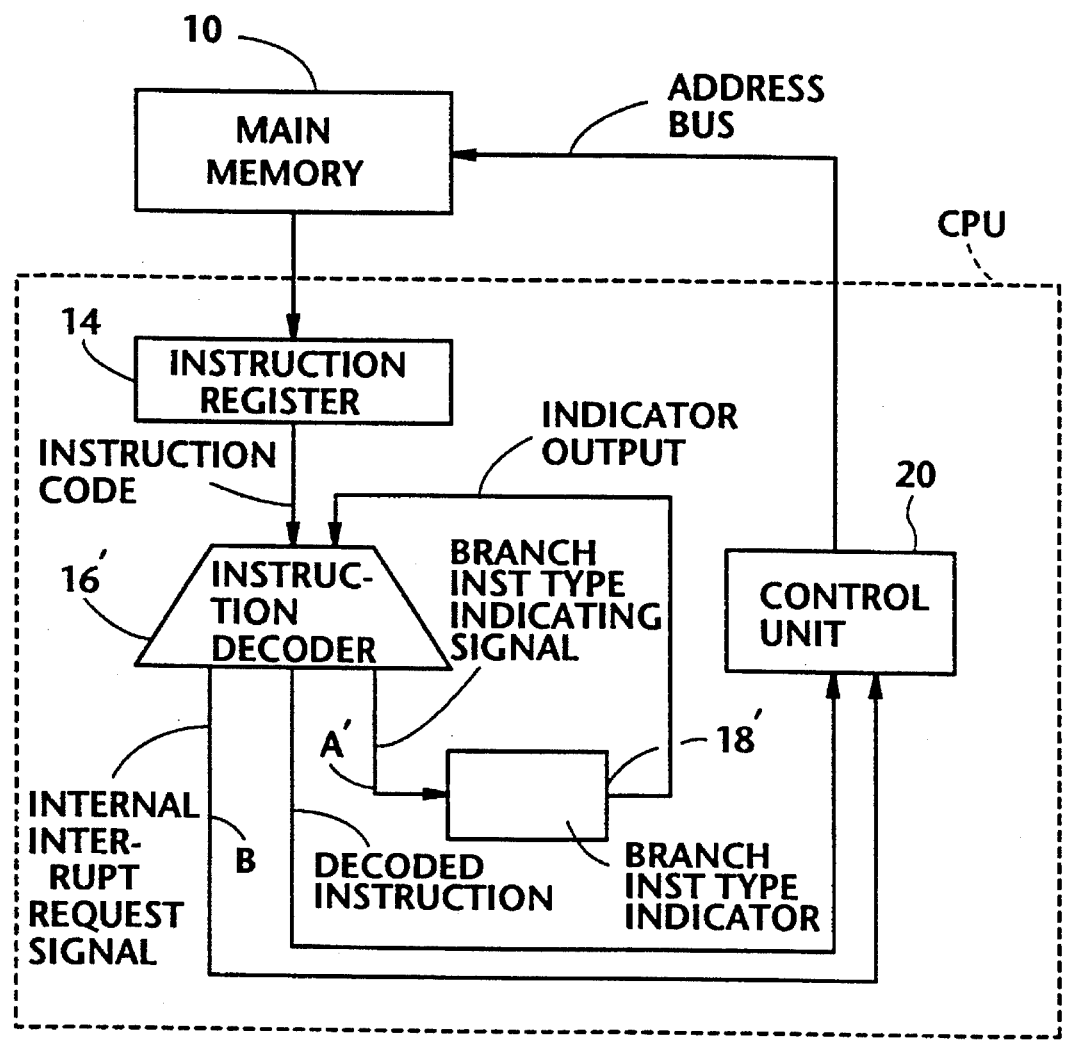
FIG. 5 is a block diagram showing a second embodiment of the present invention.
Figure 6:
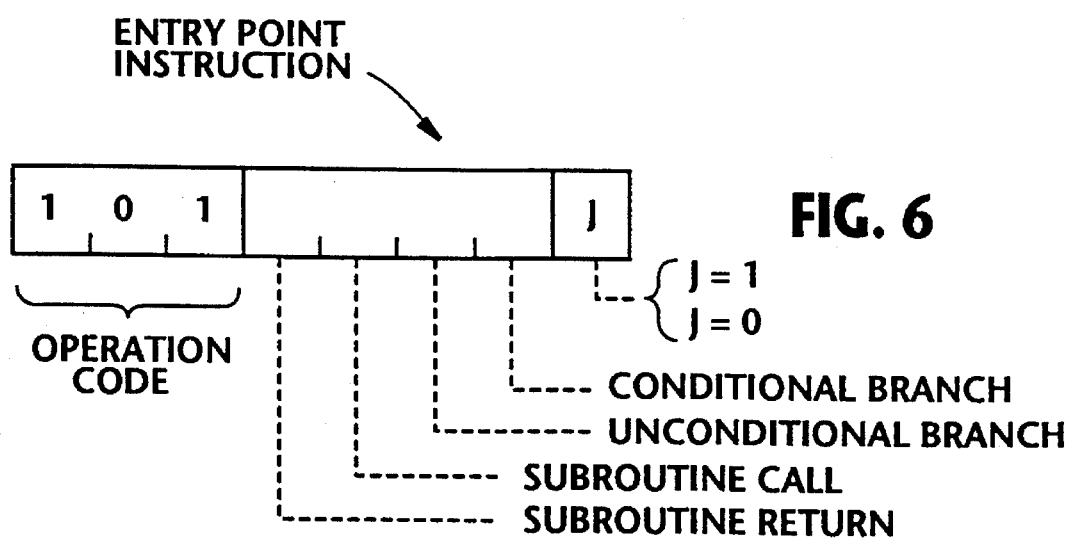
FIG. 6 is a diagram showing a code format of an entry point instruction which is used with the second embodiment and which is introduced by the present invention.

FIG. 5 is a block diagram schematically showing the second embodiment, while FIG. 6 is a code format of an entry point instruction for use in the second embodiment. FIG. 7 is a table showing relationships between inputs and outputs of an instruction decoder forming part of the arrangement of FIG. 5.

The arrangement of FIG. 5 differs from that of FIG. 1 in that the former arrangement includes an instruction decoder 16' and a branch instruction type indicator 18'. These blocks 16' and 18' correspond to the blocks 16 and 18 of FIG. 1, respectively. The instruction decoder 16' is arranged to produce a branch instruction type indicating signal A'. The other outputs of the decoder 16' (viz., the request signal B and the decoded instruction) are identical to the counterparts of the decoder 16 (FIG. 1). On the other hand, the branch instruction type indicator 18', which takes the form of a register, holds a type of a branch instruction which precedes the instruction applied to the decoder 16' from the register 14.

As shown in FIG. 6, an entry point instruction used in the second embodiment has a length of one byte (8 bits) which includes an operation code (3 bits) and a jump code (one bit) depicted by a capital letter "J". The operation code is set to "101" in this particular case but not limited thereto as referred to in the above. That is, the operation code of the entry point instruction, can be set to another sequence of bits if uniquely distinguishable from the operations codes of the instructions which have been defined by a manufacturer of a processor.

As in the first embodiment, the jump code "J" assumes a logic 1 if a branch instruction transfers control to an entry point where control is returned to the original program flow (see FIG. 3A). Similarly, the jump code "J" assumes a logic 0 in the case where a branch instruction transfers control to an entry point which indicates control transfer to a new program flow (see FIG. 3B).

The 4th–7th bits of the entry point instruction shown in FIG. 6, indicate a conditional branch instruction, an unconditional branch instruction, a subroutine call instruction, and a subroutine return instruction, respectively. That is:

| (4th–7th bits) | (Branch instruction type) |
| --- | --- |
| 0001 | conditional branch |
| 0010 | unconditional branch |
| 0100 | subroutine call |
| 1000 | subroutine return |

The operations of the second embodiment will be discussed hereinafter.

As in the first embodiment, an instruction to be processed is derived from the main memory 10 in response to a corresponding instruction address applied thereto from the control unit 20. The instruction thus fetched (viz., the next instruction to be executed) is held in the instruction register 14. The instruction decoder 16' is supplied with the instruction from the register 14 and an output of the preceding branch instruction type indicator 18'.

The indicator 18' is set to 0001 if the instruction which precedes the instruction applied to the decoder 16' (referred to as a preceding instruction for the sake of brevity), is a conditional branch instruction. On the other hand, the indicator 18' is set to 0010 if the preceding instruction is an unconditional branch instruction. Further, the indicator 18' is set to 0100 if the preceding instruction is a subroutine call instruction. Still further, the indicator 18' is set to 1000 if the preceding instruction is a subroutine return instruction. In the case where the preceding instruction is not a branch instruction, the indicator 18' stores 0000 (all zeros).

As in the first embodiment, the indicator 18' retains the content thereof until the instruction decoder 16' issues the next decoding result. The instruction decoder 16' outputs the decoded instruction and the internal interrupt request signal B both of which are applied to the control unit 20. The signal B assumes a logic 1 when an internal interrupt is required. Otherwise, the signal B assumes a logic 0.

Reference is made to FIG. 7, wherein there is shown the relationships between the inputs and outputs of the instruction decoder 16'.

The cases shown in rows Q, R, S, T, U and V of FIG. 7, correspond to the cases in rows A, B, C, D, G and H of FIG. 4 of the first embodiment, respectively. Accordingly, further descriptions thereof will be omitted for the sake of brevity.

If the output of the indicator 18' is 0000 (all zeros) as shown in rows A, C, E and G, it indicates that the instruction decoded is not a branch instruction. Therefore, if the next instruction is a branch instruction, the instruction decoder 16' produces the internal interrupt request signal B which assumes a logic 0. In these cases, the branch instruction type signal A' indicates one of the bit sequences 0001, 0010, 0100 and 1000 depending on the type of the branch instruction decoded.

On the other hand, if the output of the indicator 18' is a 4-bit sequence except for all zeros and indicates one of 0001, 0010, 0100 and 1000, and if the instruction applied to the decoder 16' is a branch instruction (viz., the cases shown in rows B, D, F, and H), the signal B assumes a logic 1 which requests an internal interruption by the control unit 20. In each of these cases, the signal A' assumes a bit sequence of 0000 as shown in FIG. 7.

Let us consider that the output of the indicator 18' indicates one of the above mentioned four branch instructions (viz., 0001, 0010, 0100 or 1000) as shown in rows I–P. If the instruction applied to the decoder 16' is the corresponding entry point instruction (viz., 101***1*, 1011, 101*1* or 1011** (the cases shown in rows I, K, M and O), the signal B assumes a logic 0 in that the expected entry point instruction is provided at the target address. The notation * indicates a bit which is not considered. Contrarily, if the instruction applied to the decoder 16' is not the corresponding entry point (the cases in rows J, L, N and P), the signal B assumes a logic 1 which requests an internal interruption by the control unit 20. In each of the above mentioned cases (rows I–P), the decoder 16' produces the signal A' which assumes a bit sequence 0000.

It will be understood that the above disclosure is representative of only two possible embodiments of the present invention and that the concept on which the invention is based is not specifically limited thereto.

What is claimed is:

1. A hardware arrangement for detecting a branch error in a program previously stored in a memory, comprising:

first means for receiving said program from said memory and further receiving a first signal, said program including an entry point instruction embedded therein at an entry point where control is transferred to new program flow, said first means successively decoding a plurality of program instructions of said program and generating decoded program instructions therefrom, said first means further generating a second signal, said second signal indicating whether or not a program instruction just decoded is a branch instruction; and second means, coupled to receive said second signal, for storing said second signal, said second means applying said second signal to said first means as said first signal at a next cycle, wherein said first means generates a third signal indicating a branch error when said first means decodes an entry point instruction indicating that control has been transferred to new program flow and said first signal indicates that a program instruction previously decoded is not a branch instruction.

2. A hardware arrangement as claimed in claim 1, wherein said first means generates said third signal indicating a branch error when said first means decodes a branch instruction and said first signal indicates that a program instruction previously decoded is a branch instruction.

3. A hardware arrangement as claimed in claim 1, wherein said first means generates said third signal indicating a branch error when said first means decodes a program instruction other than either a branch instruction or an entry point instruction and said first signal indicates that a program instruction previously decoded is a branch instruction.

4. A hardware arrangement for detecting a branch error in a program previously stored in a memory, comprising:

first means for receiving said program from said memory and further receiving a first signal, said program including an entry point instruction embedded therein at branch entry points which indicates one of a plurality of branch types, said first means successively decoding a plurality of program instructions of said program and generating decoded program instructions therefrom, said first means further generating a second signal, said second signal indicating one of said plurality of branch types; and second means, coupled to receive said second signal, for storing said second signal, said second means applying said second signal to said first means as said first signal at a next cycle, wherein said first means generates a third signal indicating a branch error when an entry point instruction just decoded is different from a branch type indicated by said first signal applied to said first means.

5. A hardware arrangement as claimed in claim 4, wherein said plurality of branch types includes a conditional branch, an unconditional branch, and a subroutine call.

* * * * *